United States Patent [19]

Marciandi

[11] 4,198,493

[45] Apr. 15, 1980

[54] SELF-EXTINGUISHING POLYMERIC COMPOSITIONS

[75] Inventor: Franco Marciandi, Rho, Italy

[73] Assignee: Montedison S.p.A., Milan, Italy

[21] Appl. No.: 941,396

[22] Filed: Sep. 11, 1978

[30] Foreign Application Priority Data

Sep. 14, 1977 [IT] Italy ............................. 27520 A/77

[51] Int. Cl.² ............................................. C08L 23/00
[52] U.S. Cl. ............................. 525/164; 260/45.7 P; 260/45.8 N; 260/45.8 NT; 260/45.9 R; 260/45.9 NC; 260/45.95 L; 260/DIG. 24; 252/8.1
[58] Field of Search ................ 260/45.8 NT, 2.5 FP, 260/45.9 NC, 45.7 P, 45.95 L, 45.7 R, DIG. 24, 45.9 R, 851, 855, 854, 45.8 A, 45.8 N; 106/15 FP; 252/8.1

[56] References Cited

U.S. PATENT DOCUMENTS

| | | | |
|---|---|---|---|
| 3,293,224 | 12/1966 | Fitz-William | 528/226 |
| 3,378,530 | 4/1968 | Little | 260/29.4 R |
| 3,392,082 | 7/1968 | Lloyd et al. | 428/524 |
| 3,936,416 | 2/1976 | Brady | 260/42.18 |
| 3,959,219 | 5/1976 | Aoyama et al. | 260/45.8 NT |
| 4,001,177 | 1/1977 | Tsutsumi et al. | 260/45.8 A |
| 4,067,847 | 1/1978 | Yui et al. | 260/45.7 R |

FOREIGN PATENT DOCUMENTS 1225386  9/1966  Fed. Rep. of Germany.
2459492  6/1976  Fed. Rep. of Germany.

*Primary Examiner*—Howard E. Schain
*Assistant Examiner*—W. Thompson

*Attorney, Agent, or Firm*—Morgan, Finnegan, Pine, Foley & Lee

[57] ABSTRACT

Self-extinguishing polymeric compositions, including a thermoplastic polymer and a flameproof additive whose essential components are:

(A) an ammonium phosphate or an amine phosphate;
(B) one or more organic compounds capable of providing, by thermal decomposition, uninflammable gaseous products and carbonaceous residues; and
(C) an ester of the isocyanuric acid of general formula:

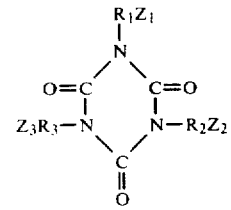

in which $R_1$, $R_2$, $R_3$, either like or unlike one another, are linear or ramified alkylene groups having 1 to 6 chain-linked carbon atoms, and $Z_1$, $Z_2$, $Z_3$ are —OH or

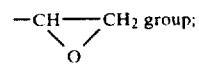

group;

the (B)/(C) ratio by weight varying from 10:1 to 1:10, and components (A) and (B)+(C) being employed each at the rate of 5 to 30% by weight on the total composition.

5 Claims, No Drawings

SELF-EXTINGUISHING POLYMERIC COMPOSITIONS

BACKGROUND OF THE INVENTION

This invention relates to compositions having an improved flame resistance and based on thermoplastic polymers, selected in particular from amongst olefinic polymers and polystyrene, or based on polymeric compositions utilized in the production of paints.

Such polymers are particularly sensitive to the ignition with flame, wherefore they need a suitable protection especially for the applications, in which the probability of a breaking out of fire is rather high.

Various methods of reducing the inflammability of the polymers are known from the art.

One of these methods consists in adding to the polymer an organic substance, partially chlorinated or brominated, and therefore thermally unstable, preferably in combination with compounds of antimony, tin or arsenic. Such combinations are rather efficient in imparting the desired flame resisting properties to the polymers, but have the drawback of being to be used in rather high concentrations in order to give a satisfactory result, this leading to a worsening of the mechanical properties of the polymers which said combinations are added to.

Furthermore these combinations exhibit the drawback of a strong evolvement of toxic fumes and gases in case of fire, besides that of causing the corrosion of the equipment in which the polymeric materials containing them are processed.

Other methods consist in adding to the polymers easily decomposable substances, with simultaneous evolvement of incombustible gases, such as ammonium phosphates or hydrated alumina.

Recently the research has been directed towards antiflame additives consisting of combinations of an ammonium phosphate or of another organic phosphorus containing compound and of one or more organic substances capable of giving, by thermal decomposition, uninflammable gaseous products (water, carbon dioxide, ammonia, nitrogen) and carbonaceous residues.

Among the various useful phosphorus containing compounds the preferred ones are, because more easy to be found, the ammonium polyphosphates falling within the general formula:

$$(NH_4)_{n+2}P_nO_{3n+1}$$

in which n is an integer equal to or higher than 2; preferably the polyphosphates' molecular weight must be high enough as to assure a low water-solubility.

The composition of the polyphosphates having the above formula, in which n is a sufficiently high number (higher than 20), is practically the one corresponding to the formula of metaphosphates $(NH_4PO_3)_n$.

Some examples of such polyphosphates are "Exolit 263" (manufactured and sold by Benckiser Knapsak GmbH.) having the composition $(NH_4PO_3)_n$, in which n is higher than 50, and "Phos-Chek P/30" (manufactured and sold by Monsanto Chemical Co.) having a similar composition.

Other employable phosphates are those deriving from amines, such as dimethylammonium and diethylammonium phosphate, ethylenediamine phosphate, melamine ortho- or pyrophosphate and still other phosphates.

Some compounds that, by thermal decomposition, provide gaseous products and carbonaceous residues are, for example, the polyalcohols, such as glycerol, trimethylol-ethane, trimethylol-propane, pentaerythritol, dipentaerythritol, tripentaerythritol, 1,2,6-hexanetriol, the carbohydrates in general (starch, cellulose, sugars) and nitrogen containing compounds, such as melamine, cyanuric acid, urea, thiourea, dicyandiamide, benzoguanamine and derivatives and condensation products thereof.

OBJECTS OF THE INVENTION

An object of this invention is to provide improved self-extinguishing polymeric composition. Other objects of the invention will be apparent from the discussion which follows:

GENERAL DESCRIPTION OF THE INVENTION

It has been discovered that one can increase the flame resisting power of the above-illustrated combinations by substituting a part of the second additive (a compound that, by thermal decomposition, gives gaseous products and carbonaceous residues) with esters of isocyanuric acid of general formula:

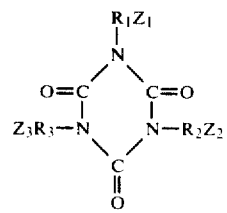

in which $R_1$, $R_2$, $R_3$, either like or unlike one another, are linear or ramified alkylene groups having 1 to 6 chain-linked carbon atoms, and $Z_1$, $Z_2$, $Z_3$ are groups —OH or

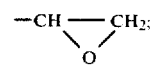

the preferred compounds being those in which $R_1$, $R_2$, $R_3$ represent polymethylene chains $-(CH_2)_n$, in which n may vary from 1 to 6, such as, for example, tris(hydroxymethyl) isocyanurate, tris(2-hydroxyethyl) isocyanurate, tris (3-hydroxy-n-propyl) isocyanurate and triglycidyl isocyanurate.

The self-extinguishing polymeric compositions of the present invention include, therefore, a thermoplastic polymer and a flame-proof additive essentially consisting of:

(A) an ammonium phosphate or an amine phosphate;
(B) one or more organic compounds capable of giving, by thermal decomposition, nonflammable gaseous products and carbonaceous residues; and
(C) an ester of the isocyanuric acid of general formula:

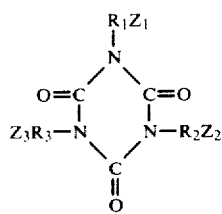

in which $R_1$, $R_2$, $R_3$, either like or unlike one another, are linear or ramified alkylene groups having 1 to 6 chain-linked carbon atoms, and $Z_1$, $Z_2$, $Z_3$ are groups —OH or

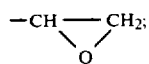

the (B)/(C) ratio by weight varying from 10:1 to 1:10, and components (A) and (B)+(C) being employed each at the rate of 5–30% by weight on the total composition. These values are valid also in case additives (B) and (C) should be condensed in a single macromolecular structure as indicated hereafter. Of course the amounts of (A) and of (B)+(C) will be the higher, the higher the uninflammability degree to be imparted to the polymeric composition.

Components (B) and/or (C) are preferably utilized in a water-insoluble form., i.e. in the cross-linked state. Cross-linking can be carried out according to techniques known in themselves: for example, when component (B) is a polyalcohol, it can be utilized in the form of a condensation product with an organic polyisocyanate, and when it is a nitrogen containing compound, it can be employed in the form of a condensation product with an aldehyde, preferably formaldehyde; when component (C) is a hydroxyalkyl isocyanurate, it can be reacted with an organic polyisocyanate or also with formaldehyde, and when it is an epoxyalkyl isocyanurate it can be subjected to cross-linking with one of the known hardeners for epoxy resins, such as, e.g., a polyamine.

According to an even more preferred embodiment of this invention, components (B) and (C) are cross-linked together, thus forming a single macromolecular structure.

These cross-linking treatments offer the advantage of rendering insoluble components (B) and/or (C) of the formulation, so that they are no longer extractable from the manufactured articles containing them, when such articles come into contact with water.

The partial substitution of additive (B) with the isocyanuric ester or with a cross-linking product thereof results in a higher flame resistance of the polymeric composition, or it permits, for an equal resistance, to reduce the total amount of additive, what advantageously influences the mechanical characteristics of the manufactured articles.

Results equivalent to those exposed hereinbefore can be obtained also with hydroxyalkyl esters of the type indicated above, in which no more than two hydroxyl groups on the average have reacted with compounds capable of reacting with them, such as organic carboxylic acids or halides thereof.

The flameproof additives described hereinbefore can be added to any type of thermoplastic polymer, in particular polyolefins, and can be utilized in the production of intumescent paints or coatings containing, as a binder, one of the polymers usually employed in this field.

The self-extinguishing compositions of the present invention can be prepared according to known methods: for example, the polymer and the flameproof additives are mixed in a blade mixer of the Banbury type at the polymer plasticizing temperature. The resulting mixture is then extruded in a DOLCI extruder (screw diameter=20 mm; length/diameter ratio of the screw=23; screw speed=20 rpm.) at the most suitable temperature for obtaining a granulated product, such temperature varying according to the polymer.

To determine the self-extinguishing properties of the polymeric compositions forming the object of this invention, it is generally operated as follows: the granulated product is utilized to mold 3 -mm thick foils by means of a small CARVER-type press, by operating for 7 minutes at a pressure of 40 kg/cm$^2$ and at a suitable temperature variable from polymer to polymer.

The self-extinguishing degree is determined on the foils so prepared either by measuring (according to standard ASTM D 2863) the oxygen index, that expresses the minimum percentage of $O_2$ in a $O_2/N_2$ mixture required by the specimen for continuously burning, or by applying standards UL-94 (published by "Underwriters Laboratories"-USA), that give an evaluation of the self-extinguishing power of the plastic materials.

Standards UL-94 contemplate various more or less severe testing conditions and permit to classify the specimen at different levels of self-extinguishing power.

In the tests recorded on Tables I to V use has been made of the Vertical Burning Test, which enables to classify the material at the following decreasing levels: V-0, V-1 and V-2. Each test is carried out on a group of 5 specimens, that may have a thickness of ¼", ⅛" or 1/16".

The specimen, kept in the vertical position by means of a suitable support, is primed with flame at its lower end and two attempts at ignition, lasting 10 seconds each, are made.

The three levels of self-extinguishing power mentioned hereinabove can be briefly defined as follows:

V-0 No specimen burns for more than 10 minutes after each flame application, neither lets burning particles fall. Furthermore, the total combustion time does not exceed 50 seconds for the 10 attempts made on the 5-specimen group.

V-1 Combustion times up to 30 seconds for the individual specimen and up to 250 seconds for the 10 attempts made on the 5-specimen group are allowable. Also at this level no specimen lets burning particles fall.

V-2 The allowable combustion times are the same as those of level V-1, but the fall of burning particles is allowable.

SPECIFIC DESCRIPTION OF THE INVENTION

The examples recorded on Tables I to V serve to illustrate the present invention, without being however a limitation thereof. Table I shows the results achievable by adding to a polypropylene powder having a melt index of 1.5 g/10 min. at first ammonium polyphosphate+melamine according to the conventional technique (example 1) and then, besides these two compounds, tris(2-hydroxyethyl)-isocyanurate according to the present invention (example 2): the advantage obtained by substituting a part of the melamine with tris(2-hydroxyethyl)-isocyanurate is evident.

TABLE I

| Ingredients | Parts by weight | |
|---|---|---|
| | Ex. 1 | Ex. 2 |
| Polypropylene | 75 | 75 |
| Ammonium polyphosphate | 15 | 15 |
| Melamine | 10 | 5 |
| Tris(2-hydroxyethyl)-isocyanurate | — | 5 |
| Oxygen index | 23.4 | 30.4 |
| UL-94 (⅛") | burns | V-0 |

The melamine utilized in examples 1 and 2 was chosen as a representative compound among those of type (B), but the effect of the hydroxyalkyl isocyanurates and of the epoxyalkyl isocyanurates extends to all the compounds that, further to thermal decomposition, originate gaseous products and carbonaceous residues: thus, for example, if pentaerythritol is used instead of melamine, an analogous effect of tris(2-hydroxyethyl)-isocyanurate can be noticed, as results from examples 3 and 4.

TABLE II

| Ingredients | Parts by weight | |
|---|---|---|
| | Ex. 3 | Ex. 4 |
| Polypropylene | 75 | 75 |
| Ammonium polyphosphate | 15 | 15 |
| Pentaerythritol | 10 | 5 |
| Tris(2-hydroxyethyl)-isocyanurate | — | 5 |
| Oxygen Index | 26.0 | 29.3 |
| UL-94 (⅛ inch) | V-2/V-0 | V-0 |

Table III shows the results attained by using, as component (B) of the flameproof additive, different compounds: melamine, tripentaerythritol, benzoguanamine, hydroxy-amino-s-triazine, trimethylol-melamine and cyanuric acid.

andiamide. After addition of dilute H₂SO₄ up to a pH-value between 1 and 2, it was heated at reflux (98° C.). After 3 hours the reaction mixture got turbid and a white solid product began to precipitate; after further 5 hours a solid product was obtained, that was separated by filtration, repeatedly washed with water and finally dried in a rotary evaporator at 150° C. and at reduced pressure.

PREPARATION OF THE BENZOGUANAMINE/FORMALDEHYDE RESIN 500 cc of deionized water, 30 cc of an aqueous solution of formaldehyde at 40% by weight/volume (0.4 moles) and as much dilute H₂SO₄ as sufficient to get a pH-value between 3 and 4 were charged into a 1000-cc glass flask, equipped with a thermometer, a stirrer and a reflux cooler; the liquid was heated to reflux temperature and 37.4 g of benzoguanamine (0.20 moles) were added thereto. It was heated at reflux for 7 hours, optionally adding dilute H₂SO₄ to the reaction mixture in order to bring the pH to the initial value. A solid product was obtained, that was isolated by hot filtering, washed with a dilute aqueous solution of NaOH and finally dried in an oven at 105° C. and at reduced pressure.

PREPARATION OF MELAMINE/FORMALDEHYDE RESIN ("LAMELITE C" OF MONTEDISON)

A formaldehyde solution at 36% by weight/volume was introduced into a multineck glass flask, and the pH-value was brought to about 9 by addition of a dilute NaOH solution; it was then heated to 70° C. and melamine was added in such amount as to have a melamine/CH₂O molar ratio of 1:2.5. It was heated to 90° C. and it was reacted keeping the pH between 9.4 and 9.8 till reaching a compatibility with water at 20° C. corre-

| Ingredients | Parts by weight | | | | | | | | | |
|---|---|---|---|---|---|---|---|---|---|---|
| | Ex. 5 | Ex. 6 | Ex. 7 | Ex. 8 | Ex. 9 | Ex. 10 | Ex. 11 | Ex. 12 | Ex. 13 | Ex. 14 |
| Polypropylene | 75 | 75 | 78 | 80 | 75 | 75 | 75 | 75 | 75 | 78 |
| Ammonium polyphosphate | 18 | 15 | 14 | 12 | 15 | 15 | 15 | 15 | 15 | 14 |
| Melamine | 3.5 | 5 | 4 | 4 | — | — | — | — | — | — |
| Tripentaerythritol | — | — | — | — | 5 | — | — | — | — | — |
| Benzoguanamine | — | — | — | — | — | 5 | — | — | — | — |
| Hydroxy-amino-s-triazine(*) | — | — | — | — | — | — | 5 | — | — | — |
| Trimethylol-melamine | — | — | — | — | — | — | — | 5 | — | — |
| Cyanuric acid | — | — | — | — | — | — | — | — | 5 | 4 |
| Tris(2-hydroxyethyl) isocyanurate | 3.5 | 5 | 4 | 4 | 5 | 5 | 5 | 5 | 5 | 4 |
| Oxygen Index | 29.4 | 30.4 | 27.9 | 27.6 | 26.9 | 28.9 | 29.4 | 29.1 | 29.8 | 27.6 |
| UL-94 (⅛inch) | V-0 | V-0 | V-0 | V-0 | V-0 | V-0 | V-0 | V-0 | V-0 | V-0 |

(*)Mixture consisting for 75% of ameline and for 25% of amelide.

Table IV shows the results of some tests carried out by using, as component (B) of the additive, some nitrogen containing compounds in the form of products of condensation with formaldehyde; in examples 17 and 18 components (B) and (C) were employed in the form of a single structure.

These resins were prepared as follows.

PREPARATION OF THE DICYANDIAMIDE/FORMALDEHYDE RESIN 300 cc of water, 187.5 cc of an aqueous solution of formaldehyde at 40% by weight/volume (2.5 moles) and 84.1 g (1 mole) of dicyandiamide were introduced into a glass flask equipped with a stirrer; it was then heated to 60°-70° C. until complete dissolution of dicysponding to 1.25 volumes of water per volume of reaction mixture; at this stage the reaction was stopped by addition of a few dilute caustic soda and the syrup so obtained was dried by means of an atomizer.

PREPARATION OF THE TRIS(2-HYDROXYETHYL) ISOCYANURATE/MELAMINE/FORMALDEHYDE RESIN

CH₂O, tris(2-hydroxyethyl) isocyanurate and melamine were reacted in a CH₂O:tris(2-hydroxyethyl) isocyanurate:melamine molar ratio=2:0.7:0.3. An aqueous formaldehyde solution at 36% by weight/volume was brought to a pH-value of about 1 by addition of dilute H₂SO₄; tris(2-hydroxyethyl) isocyanurate was then added under stirring and at 95° C., and the resulting solution was reacted 4 hours at 95° C. It was diluted with water until lowering the reaction mixture temperature to 60° C., melamine was added and it was reacted for 3 hours keeping a temperature of 60° C. A white precipitate was obtained, that was separated by filtration, repeatedly washed with a dilute solution of NaOH and finally dried in an air circulation oven at 150° C.

TABLE IV

| Ingredients | Parts by weight | | | | |
|---|---|---|---|---|---|
| | Ex. 15 | Ex. 16 | Ex. 17 | Ex. 18 | Ex. 19 |
| Polypropylene | 75 | 75 | 75 | 75 | 75 |
| Ammonium polyphosphate | 15 | 15 | 16 | 15 | 15 |
| Dicyandiamide /CH$_2$O | 5 | — | — | — | — |
| Benzoguanamine/CH$_2$O | — | 5 | — | — | — |
| Melamine/CH$_2$O | — | — | — | — | 5 |
| tris(2-hydroxyethyl) isocyanurate/melamine/CH$_2$O | — | — | 9 | 10 | — |
| Oxygen Index | — | 30.7 | 28.6 | 28.9 | — |
| UI-94 (⅛ inch) | V-0 | V-0 | V-0 | V-0 | V-0 |

The results of tests carried out on polypropylene and on impact resisting polystyrene containing 5% polybutadiene rubber are recorded on Tabe V.

Triglycidyl isocyanurate was utilized as such and in the form of an epoxy resin prepared as follows: 9.9 g of triglycidyl isocyanurate were dissolved in 20 cc of water at 50° C. and the resulting solution was added with 5.4 g of a commercial polyamine hardener (HY 2996 manufactured and sold by Ciba-Geigy). In this way a white precipitate was obtained, that was isolated by filtration, washed with warm water and dried in an oven at 105° C. at reduced pressure.

The triglycidyl isocyanurate/ethylenediamine reaction product employed in example 23 was obtained according to the following procedure: 100 cc of deionized water and 19.8 g of triglycidyl isocyanurate were introduced into a 3-neck glass flask having a capacity of 250 cc. It was stirred and heated until full dissolution of the isocyanurate, whereupon the solution temperature was raised to 60° C. and 3 g of ethylenediamine were added thereto. The reaction mixture became rapidly opalescent and gelatinous.

The product was separated by filtration, it was washed with warm water to neutral reaction and dried in an oven at 80° C. at reduced pressure. The resin from tris (2-hydroxyethyl) isocyanurate, melamine and CH$_2$O was prepared by following the same procedure already illustrated for preparing the resin employed in examples 17 and 18, with the only difference that the reagents were reacted according to the following molar ratio: CH$_2$O:tris (2-hydroxyethyl) isocyanurate:-melamine = 1.5:0.7:0.3

What we claim is:

1. Self-extinguishing polymeric compositions, comprising a hydrocarbon polymer selected from the group consisting of polyolefins and polystyrene and a flame retardant additive consisting of a mixture of:
(A) ammonium phosphate;
(B) at least one organic compound capable of providing, by thermal decomposition, uninflammable gaseous products and carbonaceous residues, said organic compound being selected from the group consisting of melamine, benzoguanamine, hydroxyamino-s-triazines, cyanuric acid, dicyandiamide, reaction products of any of the foregoing with formaldehyde, and aliphatic polyalcohols having not less than three hydroxy groups; and
(C) an ester of isocyanuric acid having the general formula:

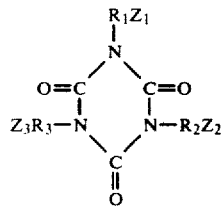

in which R$_1$, R$_2$, R$_3$ either like or unlike one another, are linear or branched alkylene groups having 1 to 6 chain-linked carbon atoms, and Z$_1$, Z$_2$, Z$_3$ are —OH or

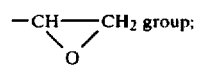

the (B)/(C) ratio by weight ranging from 10:1 to 1:10, and components (A) and (B)+(C) being employed each at the rate of 5 to 30% by weight based on the total composition.

2. Compositions according to claim 1, in which component (C) is selected from the group consisting of

TABLE V

| Ingredients | Parts by weight | | | |
|---|---|---|---|---|
| | Ex. 20 | Ex. 21 | Ex. 22 | Ex. 23 |
| Polypropylene | 75 | 75 | — | 75 |
| Polystyrene at 5% of polybutadiene | — | — | 65 | 13 |
| Ammonium polyphosphate | 15 | 17 | 22 | 15 |
| Triglycidyl isocyanurate | 5 | — | — | — |
| Melamine | 5 | 3 | — | 5 |
| Resin from triglycidyl isocyanurate + polyamine | — | 5 | — | — |
| Triglycidyl isocyanurate/ethylenediamine reaction product | — | — | — | 5 |
| Tris(2-hydroxyethyl) isocyanurate/melamine/CH$_2$O | — | — | — | — |
| Oxygen Index | 28 | — | 26.8 | 27.2 |
| UL-94 (⅛ inch) | V-1 | V-0 | V-0 | V-0 | tris(2-hydroxyethyl) isocyanurate and reaction products thereof with formaldehyde.

3. Compositions according to claim 1, in which component (C) is selected from the group consisting of triglycidyl isocyanurate and a reaction product thereof with a polyamine.

4. Compositions according to claim 1, in which components (B) and (C) are in the form of a single structure consisting of a melamine/tris(2-hydroxyethyl) isocyanurate/formaldehyde condensation product.

5. Compositions according to claim 1, in which the polyolefin is polypropylene.

* * * * *